United States Patent [19]
Murakami et al.

[11] Patent Number: 6,063,848
[45] Date of Patent: *May 16, 2000

[54] LIQUID CRYSTALLINE POLYMER COMPOSITION AND MOLDINGS

[75] Inventors: Haruji Murakami; Kazuhito Kobayashi, both of Shizuoka, Japan

[73] Assignee: Polyplastics Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/894,268

[22] PCT Filed: Dec. 27, 1996

[86] PCT No.: PCT/JP96/03880

§ 371 Date: Sep. 8, 1997

§ 102(e) Date: Sep. 8, 1997

[87] PCT Pub. No.: WO97/24404

PCT Pub. Date: Oct. 7, 1997

[30] Foreign Application Priority Data

Dec. 27, 1995 [JP] Japan ..................................... 7-340405

[51] Int. Cl.⁷ ...................................................... C08K 3/10
[52] U.S. Cl. ............................................. 524/413; 524/456
[58] Field of Search .................................. 524/494, 413, 524/456

[56] References Cited

U.S. PATENT DOCUMENTS

| | | | |
|---|---|---|---|
| 4,458,039 | 7/1984 | Eickman | 523/216 |
| 4,803,235 | 2/1989 | Okada | 524/494 |
| 4,888,127 | 12/1989 | Wada | 524/847 |
| 5,131,827 | 7/1992 | Tasada | 524/404 |
| 5,492,946 | 2/1996 | Huspeni | 524/494 |
| 5,646,209 | 7/1997 | Furuta | 524/494 |

FOREIGN PATENT DOCUMENTS

| | | |
|---|---|---|
| 3-243648 | 10/1991 | Japan . |
| 4-076049 | 3/1992 | Japan . |
| 6-172619 | 6/1994 | Japan . |
| 6-240114 | 8/1994 | Japan . |

*Primary Examiner*—Paul R. Michl
*Attorney, Agent, or Firm*—Burns, Doane, Swecker & Mathis, L.L.P.

[57] ABSTRACT

The present invention provides a liquid crystal polymer composition wherein the low coefficient of linear expansion is attained without significantly deteriorating mechanical properties by incorporating plural fibrous fillers or a fibrous filler and a particulate filler with liquid crystal polymer in a specified ratio.

9 Claims, 1 Drawing Sheet

LIQUID CRYSTALLINE POLYMER COMPOSITION AND MOLDINGS

BACKGROUND OF THE INVENTION

1. Field of the Invention

The present invention relates to a composition comprising of plural fibrous fillers, or a fibrous filler and a particulate filler, and liquid crystal polymer. More particularly, the present invention relates to molding with extremely low coefficient of linear expansion produced from the liquid crystal polymer composition.

2. Description of Related Art

Liquid crystal polymers which can form anisotropic melting phase are materials known to have low coefficient of linear expansion among thermoplastic resins. Recently, however, for high accuracy, labor saving, reduction of weight, reduction of cost, the requirements have been becoming stricter in the field of electrical and electronic field. With improvement of adhesive technique between resin parts and metallic ones, such resin parts have been often used with metallic parts. Under the circumstances, there are demand for thermoplastic resins having coefficient of linear expansion similar to that of thermoset resins or metal. Liquid crystal polymer, which is a material having lower coefficient of linear expansion for thermoplastic resins, and has higher coefficient of linear expansion in the direction perpendicular to flow compared with that in the direction of flow due to its properties, and is a highly anisotropic material. It is extremely difficult to reduce anisotropy as well as coefficient of linear expansion. Therefore, few studies have centered on reduction of coefficient of linear expansion.

DISCLOSURE OF THE INVENTION

SUMMARY OF THE INVENTION

Considering the above problems, the present inventors have studied intensively on materials having excellent properties as materials with less anisotropy and low coefficient of linear expansion. As the results, we have found that a composition comprising of liquid crystal polymer and two or more specific fillers can provide materials with lower coefficient of linear expansion without significantly deteriorating mechanical properties. Thus, we have attained the present invention.

That is, the present invention provides a liquid crystal polymer composition which comprises 100 parts by weight of a liquid crystal polymer (A), a fibrous filler (B) having an average fiber diameter of 0.1 to 8.0 μm and an average aspect ratio of at least 3, and a fibrous filler (C) having an average fiber diameter of 8.5 to 20.0 μm and average aspect ratio of 40 or below, the total amount of the components (B) and (C) being 100 to 240 parts by weight, and the ratio of the component (B) to the component (C) being 1:3 to 3:1.

In addition, the present invention provides a liquid crystal polymer composition which-comprises 100 parts by weight of a liquid crystal polymer (A), fibrous filler (B) having an average fiber diameter of 0.1 to 8.0 μm and an average aspect ratio of at least 3, and a particulate filler (D) having an average particle diameter of 100 μm or below, the total amount of the components (B) and (D) being 100 to 240 parts by weight, and the ratio of the component (B) to the component (D) being 1:3 to 3:1.

DETAILED DESCRIPTION OF THE INVENTION

The present invention will be illustrated in detail.

A liquid crystal polymer (A) used in the present invention means melt-fabricable polymer which can form optically anisotropic melting phase.

The characteristics of anisotropic melting phase can be confirmed by the conventional polarization assay utilizing rectangular polarizers. More particularly, anisotropic melting phase can be confirmed using Leitz polarization microscope by observing molten sample mounted on a Leitz hot stage under an atmosphere of nitrogen at 40× magnifications. Liquid crystal polymer applicable to the present invention exhibits optical anisotropy upon examination between rectangular polarizers, wherein polarized light generally permeates even if in a melting static state.

The aforementioned liquid crystal polymer (A) is not particularly limited, but preferably aromatic polyester or aromatic polyester amide. Polyester which partially contains aromatic polyester or aromatic polyesteramide in the same molecular chain is also encompassed. Those having inherent viscosity (I.V.) of at least about 2.0 dl/g, more preferably 2.0 to 10.0 dl/g when dissolved in pentafluorophenol at 60° C. at the concentration of 0.1% by weight may be used.

Aromatic polyester or aromatic polyester amide for the liquid crystal polymer (A) applicable to the present invention includes, particularly preferably, aromatic polyester and aromatic polyester amide having, as a constituent, at least one compound selected from the group consisting of aromatic hydroxycarboxylic acid, aromatic hydroxyamine, aromatic diamine. More particularly, (1) polyester mainly consisting of one or two or more aromatic hydroxycarboxylic acid and derivative thereof; (2) polyester mainly consisting of (a) one or two or more aromatic hydroxycarboxylic acid and derivative thereof; (b) one or two or more aromatic dicarboxylic acid, alicyclic dicarboxylic acid and derivative thereof; (c) at least one or two or more aromatic diol, alicyclic diol, aliphatic diol and derivative thereof; (3) polyester amide mainly consisting of (a) one or two or more aromatic hydroxycarboxylic acid and derivative thereof; (b) one or two or more aromatic hydroxyamine, aromatic diamine and derivative thereof; (c) one or two or more aromatic dicarboxylic acid, alicyclic dicarboxylic acid and derivative thereof; (4) polyester amide mainly consisting of (a) one or two or more aromatic hydroxycarboxylic acid and derivative thereof; (b) one or two or more aromatic hydroxyamine, aromatic diamine and derivative thereof; (c) one or two or more aromatic dicarboxylic acid, alicyclic dicarboxylic acid and derivative thereof; (d) at least one or two or more aromatic diol, alicyclic diol, aliphatic diol and derivative thereof. Moreover, the aforementioned constituents may be used along with a molecular weight modifier, as needed.

Preferred example of the concrete compounds constituting the aforementioned liquid crystal polymer (A) applicable to the present invention includes, for example, aromatic hydroxycarboxylic acid such as p-hydroxybenzoic acid and 6-hydroxy-2-naphthoic acid; aromatic diol such as 2,6-dihydroxynaphthalene, 1,4-dihydroxynaphthalene, 4,4'-dihydroxybiphenyl, hydroquinone, resorcin and compounds represented by the following formulae [1] and [2]; aromatic dicarboxylic acid such as terephthalic acid, isophthalic acid, 4,4'-diphenyldicarboxylic acid, 2,6-naphthalenedicarboxylic acid and compounds represented by the following formula [3]; aromatic amine such as p-aminophenol and p-phenylenediamine.

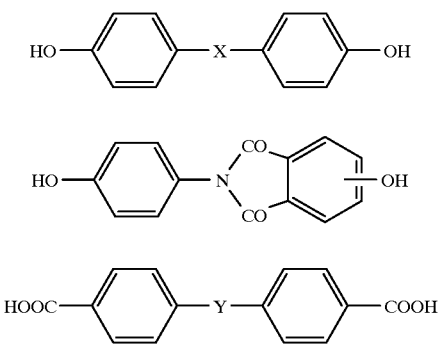

[wherein, X is a group selected from alkylene($C_1$–$C_4$), alkylydene, —O—, —SO—, —$SO_2$—, —S—, —CO—; Y is a group selected from —$(CH_2)_n$— (in which, n is 1 to 4), —$O(CH_2)_nO$—, (in which, n is 1 to 4)].

Particularly preferred liquid crystal polymer (A) applicable to the present invention is aromatic polyester amide containing 6-hydroxy-2-naphthoic acid, terephthalic acid, and p-aminophenol as constituents.

To attain an object of the present invention, low coefficient of linear expansion, fibrous filler (B) having average fiber diameter of 0.1 to 8.0 μm and average aspect ratio of at least 3; and fibrous filler (C) having average fiber diameter of 8.5 to 20.0 μm and average aspect ratio of 40 or below, preferably 20 or below are used, and the total amount should be 100 to 240 parts by weight. That is, two fibrous fillers with different fiber diameter should be used. Among the fibrous fillers with greater average fiber diameter which have great reinforcing effect, fibrous fillers with lower average fiber diameter exist to fill up, thereby attaining low coefficient of linear expansion without anisotropy and enhancing reinforcing effect. Accordingly, product with such low coefficient of linear expansion can not be obtained using fibrous fillers with the same average fiber diameter.

In this case, if average fiber diameter of the component (C) is greater than 20.0 μm, the defects of the fibrous filler itself may increase and the mechanical properties of the fibrous filler itself may decrease, undesirably resulting in poor reinforcing effect to be expected. On the other hand, if the average aspect ratio is more than 40, coefficient of linear expansion in the direction of flow will be further reduced due to orientation of fibers, while it will increase in the direction of perpendicular to that of flow, which is undesirable.

In the present invention, as fibrous filler (B) having average fiber diameter of 0.1 to 8.0 μm and average aspect ratio of at least 3, various organic fibers such as carbon fibers, whiskers, metallic fibers, inorganic fibers and mineral fibers can be used.

Examples of these fillers will be illustrated below.

As carbon fibers, PAN fibers prepared from polyacrylonitrile, pitch fibers prepared from pitch can be used.

As whiskers, silicon nitride whiskers, silicon trinitride whiskers, basic magnesium sulfate whiskers, barium titanate whiskers, silicon carbide whiskers, boron whiskers, etc.; and as metallic fibers, fibers of soft steel, stainless steel, steel and alloy thereof, brass, aluminum and alloy thereof, lead, etc. may be used.

As inorganic fibers, various fibers such as rock wool, zirconia, alumina-silica, potassium titanate, barium titanate, silicon carbide, alumina, silica and blast furnace slag, etc. may be used.

As mineral fibers, asbestos, wollastonite and the like may be used.

Among them, wollastonite is preferred considering cost and efficiency.

In the present invention, as fibrous filler (C) having average fiber diameter of 8.5 to 20.0 μm and average aspect ratio of 40 or below, milled fiber, etc. may be used.

Example of these fillers will be illustrated below.

As milled fibers, in addition to the conventional milled glass fibers, milled fibers coated with metal such as nickel and copper, silane fibers and the like may be used.

As alternative method to attain low coefficient of linear expansion, fibrous filler (B) having average fiber diameter of 0.1 to 8.0 μm and average aspect ratio of at least 3 and particulate filler (D) having average particle diameter of 100 μm or below may be used, wherein the total amount should be 100 to 240 parts by weight.

In this case, it is important to use aforementioned fillers as fibrous fillers (B). When fillers having average fiber diameter more than 8.0 μm, it is difficult to attain homogeneous dispersion with particulate fillers even if the fillers have average aspect ratio at least 3, undesirably resulting in deteriorated mechanical properties. When the average aspect ratio is 3 or below, reinforcing effect of the fibrous fillers may not be expected, which is undesirable.

In the present invention, particulate fillers means particle-shaped material which does not extend in specific directions like fiber, disc, strip, etc., and has average aspect ratio of 1 to 2. The average particle diameter is 100 μm or below, preferably 1 to 50 μm. It is important to use particulate fillers having average particle diameter of 100 μm or below. Using those having average diameter more than 100 μm, the probability of mutual contact of particulate fillers becomes higher, undesirably resulting in difficulty of homogenous dispersion and deterioration of mechanical properties. For example, those consisting of kaolin, clay, vermiculite, calcium silicate, aluminum silicate, feldspar powder, acid clay, agalmatolite clay, sericite, sillimanite, bentonite, gohun, carbonate such as barium carbonate, magnesium carbonate and dolomite, sulfate such as barytes, branfix, precipitated calcium sulfate, calcined gypsum and barium sulfate, hydroxide such as hydrated alumina, alumina, oxide such as antimony oxide, magnesia, titanium oxide, zinc white, quartz sand, quartz, white carbon and diatomaceous earth, sulfide such as molybdenum disulfide, metal powder, organic polymer such as fluororesin, organic low molecular crystal such as diphenyl ether bromide. Among them, glass beads are preferred considering cost and efficiency.

As mentioned above, it is important to use two types of fillers having specific shapes. To attain low coefficient of linear expansion, the amount and ratio of components of fillers are also important requirement. That is, to attain low coefficient of linear expansion, greater amount of filler is preferred. However, too much filler will deteriorate extrudability and moldability, and further deteriorate mechanical strength. On the other hand, too little amount will fail to attain low coefficient of linear expansion. Accordingly, the total amount of the filler components should be 100 to 240 parts by weight, preferably 140 to 185 parts by weight based on 100 parts by weight of liquid crystal polymer (A).

In this case, fibrous fillers (B) are useful for improve low coefficient of linear expansion and mechanical properties. However, too much amount will deteriorate extrusion ability, resulting in fragile material. Fibrous fillers (C) are useful for improve low coefficient of linear expansion and mechanical properties. However, too much amount will increase anisotropy of the material. Particulate filler will promote low coefficient of linear expansion and reduce anisotropy of the material, however, too much fillers will lead to deterioration of mechanical properties. Accordingly, to attain the object of the present invention, the ratio of the fibrous fillers (B) to fibrous fillers (C) or particulate fillers (D) is 1:3 to 3.1, preferably 1:2 to 2:1, more preferably 2:3 to 3:2.

Fibrous and particulate fillers used in the present invention may be directly used, but they may be used along with the generally used, known surface treatment agent, greige goods.

Additives such as nucleating agents, pigment such as carbon black, antioxidants, stabilizers, plasticizers, lubricant, mold releasing agents and flame retardants may be added to the thermoplastic composition to provide thermoplastic composition imparted with the desired properties, which are encompassed within the category of the thermoplastic resin compositions according to the present invention.

The injection-molded articles of the present invention are prepared by using two or more fillers to offset the mutual defects, thereby reducing anisotropy characteristic of liquid crystal polymer and providing low coefficient of linear expansion without deteriorating mechanical properties. Further, individual filler is homogeneously dispersed in the molding, and higher efficiency is exhibited by the dispersion state wherein the second fillers exist among the first ones.

As mentioned above, the present invention relates to injection-molded articles suitable which are moldings having in any directions low coefficient of linear expansion of $4.0 \times 10^{-5}/°$ C. or below, suitable to be used along with metallic parts, and suitable in the recent field of electric and electronic parts.

To produce aforementioned thermoplastic resin composition, the both fillers may be compounded at the compounding ratio and kneaded. In general, the material is kneaded in an extruder, extruded into pellets and used for injection molding. It is not particularly limited to kneading using an extruder.

Figure 1:
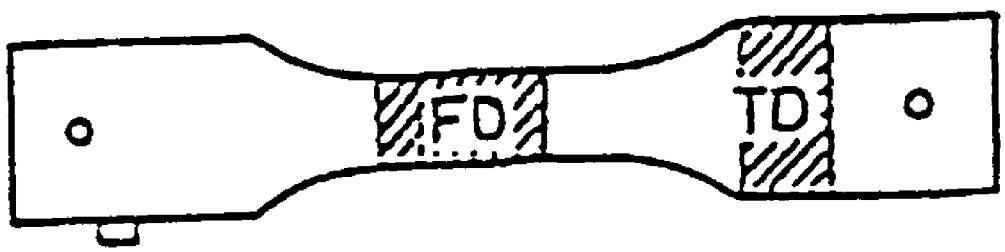
FIG. 1 shows an ASTM tensile test piece used for measurement of coefficient of linear expansion in Examples and a cutaway view thereof.

FD: direction of flow ($18^L \times 12.5^W \times 3^T$)

TD: transverse direction ($19^L \times 12.5^W \times 3^T$)

EXAMPLE

The present invention will be illustrated in detail in the following Examples. The present invention is not construed to be limited to them. The methods for evaluation are as follows:

(Coefficient of linear expansion)

ASTM Tensile test pieces were cut as shown in FIG. 1 were used and coefficient of linear expansion ($\times 10^{-5}/°$ C.) was measured using a thermal dilatometer by differential measurement of expansion manufactured by Rigaku Denki KK. Coefficient of linear expansion was expressed as data at 50° C.

(Flexural modulus of elasticity)

According to ASTM D790, flexural modulus of elasticity (MPa) was measured using a test piece of 3.2 mm thickness for flexural test.

(Fiber length of fillers)

Tensile test pieces were cut into appropriate size, charged in a crucible placed in an electric furnace at 600° C. to eliminate resin components. Subsequently, residual fillers were dispersed in 5% aqueous solution of polyethylene glycol, and spread on Petri dish preventing fillers from overlapping each other. The fillers were projected using a magnifying projector and 100 of the fillers were measured to obtain average fiber length.

(Fiber diameter or particle diameter of fillers)

The residual filler obtained in the same manner as described for measurement of fiber length was dispersed on a sample bed for scanning electron microscope and observed at the magnification fit for fiber diameter or particle diameter. Among them, 100 of fillers were measured to obtain average fiber diameter or particle diameter.

According to the above results, average aspect ratio of filler was obtained.

Examples 1, 2 and Comparative Examples to 3

Based on 100 parts by weight of liquid crystal polyester (manufactured by Polyplastics KK, Vectra A950), wollastonite (average fiber diameter, 3.5 $\mu$m; average aspect ratio, 20) and milled glass fiber (average fiber diameter, 13 $\mu$m; average aspect ratio, 5.4) were dry blended in the ratio shown in Table 1, after which molten and kneaded using a biaxial extruder to pelletize. The obtained pellets were molded using an injection molding machine to prepare pieces for tensile test (thickness, 3 mm) and for flexural test (thickness, 3.2 mm). The obtained test pieces were measured for coefficient of linear expansion and flexural elasticity to obtain the results shown in Table 1.

Comparative Example 4

The procedure in Example 1 was repeated, except that glass fibers (chopped strand of average fiber diameter, 10 $\mu$m; and fiber length, 3 mm) were used instead of wollastonite, to prepare test pieces and evaluated. The results are shown in Table 1.

Comparative Examples 5 and 6

In the same manner as in Example 1, test pieces were prepared for the case using only 100 parts by weight of wollastonite and for the case using only 100 parts by weight of milled glass fiber, and evaluated. The results are shown in Table 1.

Examples 3 and 4 and Comparative Examples 7 to 9

Based on 100 parts by weight of liquid crystal polyester (manufactured by Polyplastics KK, Vectra A950), wollastonite (average fiber diameter, 3.5 $\mu$m; average aspect ratio, 20) and glass beads (average particle diameter, 50 $\mu$m) were dry blended in the ratio shown in Table 2, after which melt kneaded using a biaxial extruder to pelletize. The obtained pellets were molded using an injection molding machine to prepare pieces for tensile test (thickness, 3 mm) and for flexural test (thickness, 3.2 mm). The obtained test specimen was measured for coefficient of linear expansion and flexural elasticity to obtain the results shown in Table 2.

Comparative Example 10

The procedure in Example 3 was repeated, except that glass fiber (chopped strand of average fiber diameter, 10 $\mu$m; and fiber length, 3 mm) was used instead of wollastonite, to prepare test pieces which were measured. The results are shown in Table 2.

Comparative Example 11

In the same manner as in Example 3, except that glass beads having average particle diameter of 120 $\mu$m were used, test pieces were prepared and evaluated. The results are shown in Table 2.

Example 5

Based on 100 parts by weight of liquid crystal polyester (manufactured by Polyplastics KK, Vectra A950), potassium titanate fiber (average fiber diameter, 0.3 μm; average aspect ratio, 50) and glass beads (average particle diameter, 50 μm) were dry blended in the ratio shown in Table 2, after which melt kneaded using a biaxial extruder and pelletized. Such pellets were molded using an injection molding machine to prepare pieces for stretching test (thickness, 3 mm) and for flexural test (thickness, 3.2 mm). The obtained test pieces were measured for coefficient of linear expansion and flexural elasticity to obtain the results shown in Table 2.

Comparative Example 12

In the same manner as in Example 5, except that a ratio of potassium titanate fibers to glass beads was changed as shown in Table 2, test specimens were prepared and evaluated. The results are shown in Table 2.

Comparative Example 13

For the case using 100 parts by weight of glass beads alone, test pieces were prepared and evaluated in the same manner as in Example 5. The results are shown in Table 2.

Example 6 and Comparative Examples 14 and 15

Based on 100 parts by weight of polyester amide (manufactured by Polyplastics KK, Vectra B950), wollastonite (average fiber diameter, 3.5 μm; average aspect ratio, 20) and glass beads (average particle diameter, 50 μm) were dry blended in the ratio shown in Table 3, after which melt kneaded using a biaxial extruder and pelletized. Such pellets were molded using an injection molding machine to prepare pieces for tensile test (thickness, 3 mm) and for flexural test (thickness, 3.2 mm). The obtained test specimen was measured for coefficient of linear expansion and flexural elasticity to obtain the results shown in Table 3.

Example 7

In the same manner as in Example 6, except that glass beads were substituted with milled glass fibers (average fiber diameter, 13 μm; average aspect ratio, 5.4), test pieces were prepared and evaluated. The results are shown in Table 3.

Comparative Example 16

Based on 100 parts by weight of liquid crystal polyester amide (manufactured by Polyplastics KK, Vectra B950), 75 parts by weight of wollastonite (average fiber diameter, 3.5 μm; average aspect ratio, 20) were dry blended, melt kneaded using a biaxial extruder, glass fibers (chopped strand of average fiber diameter, 10 μm; fiber length, 3 mm) were side fed and pelletized. Such pellets were molded using an injection molding machine to prepare pieces for tensile test (thickness, 3 mm) and for flexural test (thickness, 3.2 mm). The obtained test pieces were measured for coefficient of linear expansion and flexural elasticity to obtain the results shown in Table 3.

TABLE 1

| | Filler | Ex. 1 | Ex. 2 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|
| (B) First Filler (Parts by weight) | Type | Wollastonite | Wollastonite | Wollastonite | Wollastonite | Wollastonite | GF | — | — |
| | Amount added | 75 | 100 | 45 | 100 | 20 | 75 | — | 100 |
| | Average fiber diameter (μm) | 3.5 | 3.5 | 3.5 | 3.5 | 3.5 | 10 | — | 3.5 |
| | Average aspect ratio | 20 | 20 | 20 | 20 | 20 | 23 | — | 20 |
| (C) Second Filler (Parts by weight) | Type | MF | MF | MF | MF | MF | MF | MF | — |
| | Amount added | 75 | 100 | 45 | 20 | 100 | 75 | 100 | — |
| | Average fiber diameter (μm) | 13 | 13 | 13 | 13 | 13 | 13 | 13 | — |
| | Average aspect ratio | 5.4 | 5.4 | 5.4 | 5.4 | 5.4 | 5.4 | 5.4 | — |
| Coefficient of Linear Expansion (×10$^{-5}$/° C.) | FD | 0.52 | 0.49 | 0.80 | 0.60 | 0.87 | 0.42 | 1.01 | 0.63 |
| | TD | 3.12 | 3.11 | 4.60 | 5.02 | 4.82 | 4.08 | 4.82 | 5.42 |
| Flexural Elasticity (MPa) | | 14900 | 15200 | 13500 | 14900 | 15300 | 18000 | 14100 | 13900 |

\* GF: Glass fiber
MF: Milled glass fiber

TABLE 2

| | Filler | Ex. 3 | Ex. 4 | Com. Ex. 7 | Com. Ex. 8 | Com. Ex. 9 |
|---|---|---|---|---|---|---|
| (B) First Filler (Parts by Weight) | Type | Wollastonite | Wollastonite | Wollastonite | Wollastonite | Wollastonite |
| | Amount added | 75 | 100 | 45 | 130 | 30 |
| | Average fiber diameter (μm) | 3.5 | 3.5 | 3.5 | 3.5 | 3.5 |
| | Average aspect ratio | 20 | 20 | 20 | 20 | 20 |
| (C) Second | Type | GB | GB | GB | GB | GB |
| | Amount added | 75 | 100 | 45 | 130 | 120 |

TABLE 2-continued

| Filler (Parts by Weight) | Average particle diameter (μm) | 50 | 50 | 50 | 50 | 50 |
|---|---|---|---|---|---|---|
| | Average aspect ratio | — | — | — | — | — |
| Coefficient of Linear expansion (×10⁻⁵/° C.) | FD | 1.53 | 1.02 | 1.90 | cannot be extruded | 1.80 |
| | TD | 3.10 | 3.08 | 4.50 | | 4.25 |
| Flexural Elasticity (MPa) | | 12800 | 13200 | 9500 | | 11000 |

| | Filler | Com. Ex. 10 | Com. Ex. 11 | Ex. 5 | Com. Ex. 12 | Com. Ex. 13 |
|---|---|---|---|---|---|---|
| (B) First Filler (Parts by Weight) | Type | GF | Wollastonite | Potassium titanate fiber | Potassium titanate fiber | — |
| | Amount added | 75 | 75 | 30 | 130 | — |
| | Average fiber diameter (μm) | 10 | 3.5 | 0.3 | 0.3 | — |
| | Average aspect ratio | 23 | 20 | 50 | 50 | — |
| (C) Second Filler (Parts by Weight) | Type | GB | GB | GB | GB | GB |
| | Amount added | 75 | 75 | 90 | 40 | 100 |
| | Average particle diameter (μm) | 50 | 120 | 50 | 50 | 50 |
| | Average aspect ratio | — | — | — | — | — |
| Coefficient of Linear Expansion (×10⁻⁵/° C.) | FD | 1.20 | 2.35 | 0.80 | cannot be extruded | 2.10 |
| | TD | 4.05 | 4.56 | 3.85 | | 5.20 |
| Flexural Elasticity (MPa) | | 16400 | 11000 | 15000 | | 8800 |

\* GF: Glass fiber
GB: Glass beads

TABLE 3

| | Filler | Ex. 6 | Ex. 7 | Com. Ex. 14 | Com. Ex. 15 | Com. Ex. 16 |
|---|---|---|---|---|---|---|
| (B) First Filler (Parts by weight) | Type | Wollastonite | Wollastonite | Wollastonite | Wollastonite | Wollastonite |
| | Amount to be added | 75 | 75 | 45 | 130 | 75 |
| | Average fiber diameter (μm) | 3.5 | 3.5 | 3.5 | 3.5 | 3.5 |
| | Average aspect ratio | 20 | 20 | 20 | 20 | 20 |
| (C) Second Filler (Parts by weight) | Type | GB | MF | GB | GB | GF |
| | Amount to be added | 75 | 75 | 45 | 130 | 75 |
| | Average fiber diameter (μm) | — | 13 | — | — | 10 |
| | Average particle diameter (μm) | 50 | — | 50 | 50 | — |
| | Average aspect ratio | — | 5.4 | — | — | 45 |
| Coefficient of Linear Expansion (×10⁻⁵/° C.) | FD | 0.90 | 0.78 | 1.30 | cannot be extruded | 0.52 |
| | TD | 2.26 | 2.55 | 4.40 | | 4.02 |
| Bending Elasticity (MPa) | | 16200 | 18600 | 14000 | | 20100 |

\* GF: Glass fiber
GB: Glass beads
MF: Milled glass fiber

We claim:

1. A liquid crystal polymer composition which forms upon injection molding a molding having a coefficient of linear expansion in any direction at an atmosphere temperature of 50° C. of $4.0 \times 10^{-5}$/° C. or less comprising 100 parts by weight of a liquid crystal polymer (A), a fibrous filler (B) selected from the group consisting of wollastonite, potassium titanate fiber, and mixtures thereof having an average fiber diameter of 0.1 to 8.0 μm and an average aspect ratio of at least 3, and a fibrous filler (C) having an average fiber diameter of 8.5 to 20.0 μm and average aspect ratio of 40 or below, the total amount of the components (B) and (C) being 100 to 240 parts by weight, and the ratio of the component (B) to the component (C) being 1:3 to 3:1.

2. The composition according to claim 1, wherein the ratio of the component (B) to the component (C) is 1:2 to 2:1.

3. The composition according to claim 1, wherein the liquid crystal polymer (A) is a polyester amide.

4. A liquid crystal polymer composition which forms upon injection molding a molding having a coefficient of linear expansion in any direction at an atmosphere temperature of 50° C. of $4.0 \times 10^{-5}$/° C. or less comprising 100 parts by weight of a liquid crystal polymer (A), fibrous filler (B) selected from the group consisting of wollastonite, potassium titanate fiber, and mixtures thereof having an average fiber diameter of 0.1 to 8.0 μm and an average aspect ratio of at least 3, and a particulate filler (D) having an average particle diameter of 100 μm or below, the total amount of the components (B) and (D) being 100 to 240 parts by weight, and the ratio of the component (B) to the component (D) being 1:3 to 3:1.

5. The composition according to claim 4, wherein the ratio of the component (B) to the component (D) is 1:2 to 2:1.

6. The composition according to claim 4, wherein the particulate filler (D) is glass beads.

7. The composition according to claim 4, wherein the liquid crystal polymer (A) is a polyester amide.

8. A molding produced from the liquid crystal polymer composition according to claim 1, wherein the coefficient of linear expansion thereof is $4.0 \times 10^{-5}$/° C. or less in any direction at the atmospheric temperature of 50° C.

9. A molding produced from the liquid crystal polymer composition according to claim 5, wherein the coefficient of linear expansion thereof is $4.0 \times 10^{-5}$/° C. or less in any direction at the atmospheric temperature of 50° C.

* * * * *